(12) United States Patent
Zhu

(10) Patent No.: US 6,201,834 B1
(45) Date of Patent: Mar. 13, 2001

(54) METHOD AND APPARATUS FOR PACKET LOSS RECOVERY WITH STANDARD-BASED PACKET VIDEO

(75) Inventor: Chunrong Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/772,227

(22) Filed: Dec. 20, 1996

(51) Int. Cl.[7] .................................................. H04B 1/66
(52) U.S. Cl. ...................................................... 375/240.27
(58) Field of Search ............................ 348/19, 466, 400, 348/401, 402, 403, 409, 410, 411, 412, 413; 370/17, 392; 371/37.5, 37.7; 714/756, 758; 375/240.27

(56) References Cited

U.S. PATENT DOCUMENTS

| | | | |
|---|---|---|---|
| 4,989,088 | * 1/1991 | Wada et al. | 348/19 |
| 5,175,618 | * 12/1992 | Ueda et al. | 348/416 |
| 5,289,276 | * 2/1994 | Siracussa et al. | 348/467 |
| 5,442,400 | * 8/1995 | Sun et al. | 348/402 |
| 5,446,726 | * 8/1995 | Rostoker et al. | 370/17 |
| 5,455,629 | * 10/1995 | Sun et al. | 348/466 |
| 5,534,937 | * 7/1996 | Zhu et al. | 348/466 |
| 5,608,450 | * 3/1997 | Agarwal et al. | 348/19 |
| 5,621,467 | * 4/1997 | Chien et al. | 348/409 |
| 5,708,659 | * 1/1998 | Rostoker et al. | 370/392 |

OTHER PUBLICATIONS

Clark, D., and Tennenhouse, D, Architechtural Considerations For A New Generation Of Protocols, Sigcomm '90 Symposium, Sep. 24–27, 1990, *Computer Communications Review*, vol. 20, No. 4, pp. 200–208, Sep. 1990.

ITU–T, Video Coding For Low Bitrate Communication, Draft H.263, Dec. 5, 1995.

ITU–T, Video Codec For Audiovisual Services At *p* x 64 kbits, H.261, Mar., 1993,.

Zhu, C., RTP Payload Format For H.263 Video Stream, internet–draft, Jun. 10, 1996, expires Dec. 10, 1996, doument draft–ietf–avt–rtp–payload–00.txt on ftp://ds.internic.net/internet–drafts Casner, S., Faq On MBONE, ftp://ftp.isi.edu/mbone/faq.txt.

Schulzrinne, H., Casner, S., Frederick, R., Jacobson, V., RTP: A Transport Protocol For Real–Time Applications, Jan., 1996.

Bach, M., The Design Of The Unix Operating System, Prentice–Hall, Inc., 1986, including Sections 1.5 and 6.2 through 6.4.

* cited by examiner

*Primary Examiner*—Chris S. Kelley
*Assistant Examiner*—Gims Philippe
(74) *Attorney, Agent, or Firm*—Kenyon & Kenyon

(57) ABSTRACT

In a packet-based video environment, video frame data is compressed according to a block-based vide transform algorithm and fragmented into a sequence of packets. One or more packets are appended with transport header information indicating the place in the sequence for each packet. The packets of compressed video frame data are sent over a network or transmission medium to a remote user creating the possibility that one or more of the packets would be lost. When the packets are received, the transport header is checked to determine if any packets are lost. An extended compressed bitstream is created that includes the compressed video frame data from the packets and bitstream information stream data that identifies which of the video frame data are lost and indicating parameters for decompressing the compressed bitstream. Replacement compressed bitstream data is placed in the compressed bitstream in place of video frame data in the lost packet so that uncompressed video image data can be generated based on the data in the bitstream information stream.

18 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|P|SBIT|EBIT| SRC |R       |I|A|S|DBQ|TRB|  TR       |
+-+-+-+-+-+-+-+-+-+-+-+-+-+-+-+-+-+-+-+-+-+-+-+-+-+-+-+-+-+-+-+-+
```

Fig. 7a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|P|SBIT|EBIT| SRC |QUANT |I|A|S| GOBN |  MBA       |
+-+-+-+-+-+-+-+-+-+-+-+-+-+-+-+-+-+-+-+-+-+-+-+-+-+-+-+-+-+-+-+-+
|  HMV1     | VMV1     | HMV2    | VMV2    |
+-+-+-+-+-+-+-+-+-+-+-+-+-+-+-+-+-+-+-+-+-+-+-+-+-+-+-+-+-+-+-+-+
```

Fig. 7b

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|P|SBIT|EBIT| SRC |QUANT |I|A|S| GOBN |  MBA       |
+-+-+-+-+-+-+-+-+-+-+-+-+-+-+-+-+-+-+-+-+-+-+-+-+-+-+-+-+-+-+-+-+
|  HMV1     | VMV1     | HMV2    | VMV2    |
+-+-+-+-+-+-+-+-+-+-+-+-+-+-+-+-+-+-+-+-+-+-+-+-+-+-+-+-+-+-+-+-+
| R               |DBQ|TRB|  TR     |
+-+-+-+-+-+-+-+-+-+-+-+-+-+-+-+-+-+-+-+-+-+-+-+-+-+-+-+-+-+-+-+-+
```

Fig. 7c

| Index | MB type | CBPC (56) | Number of bits | Code |
|---|---|---|---|---|
| 0 | 3 | 00 | 1 | 1 |
| 1 | 3 | 01 | 3 | 001 |
| 2 | 3 | 10 | 3 | 010 |
| 3 | 3 | 11 | 3 | 011 |
| 4 | 4 | 00 | 4 | 0001 |
| 5 | 4 | 01 | 6 | 0000 01 |
| 6 | 4 | 10 | 6 | 0000 10 |
| 7 | 4 | 11 | 6 | 0000 11 |
| 8 | Stuffin | -- | 9 | 0000 0000 1 |

Fig. 8
Prior Art

| MBA | Code | | MBA | Code | | |
|---|---|---|---|---|---|---|
| 1 | 1 | | 17 | 0000 | 0101 | 10 |
| 2 | 011 | | 18 | 0000 | 0101 | 01 |
| 3 | 010 | | 19 | 0000 | 0101 | 00 |
| 4 | 0011 | | 20 | 0000 | 0100 | 11 |
| 5 | 0010 | | 21 | 0000 | 0100 | 10 |
| 6 | 0001 | 111 | 22 | 0000 | 0100 | 011 |
| 7 | 0001 | 110 | 23 | 0000 | 0100 | 010 |
| 8 | 0000 | 1011 | 24 | 0000 | 0100 | 001 |
| 9 | 0000 | 1010 | 25 | 0000 | 0100 | 000 |
| 10 | 0000 | 1001 | 26 | 0000 | 0011 | 111 |
| 11 | 0000 | 1000 | 27 | 0000 | 0011 | 110 |
| 12 | 0000 | 0111 | 28 | 0000 | 0011 | 101 |
| 13 | 0000 | 0110 | 29 | 0000 | 0011 | 100 |
| 14 | 0000 | 0101 | 30 | 0000 | 0011 | 011 |
| 15 | 0000 | 0101 | 31 | 0000 | 0011 | 010 |
| 16 | 0000 | 0101 | 32 | 0000 | 0001 | 001 |
| | | | 33 | 0000 | 0001 | 000 |
| | | | MBA stuffing | 0000 | 0001 | 111 |
| | | | Start code | 0000 | 0000 | 0000 0001 |

Fig. 9
Prior Art

METHOD AND APPARATUS FOR PACKET LOSS RECOVERY WITH STANDARD-BASED PACKET VIDEO

BACKGROUND OF THE INVENTION

The present invention pertains to a method and apparatus for correcting packet loss in a standard-based packet video system. More particularly, the present invention pertains to monitoring a packet-loss event and correcting such an event.

A typical video communication system 10 that is known in the art is shown in FIG. 1. The system 10 allows communication between the systems of User A 11 and User B 13 via a transmission medium or network 12 (e.g. a so-called Ethernet network). In this example, the system at User A 11 includes a processor 15, such as a Pentium® processor manufactured by Intel Corporation, Santa Clara, Calif., executing code stored in memory 19. A video system 17 is provided that captures and compresses video image data for transmission over the network 12 to the station at User B 13. In this example, the video subsystem 17 is coupled to the processor 15 via a first bus 16 such as one operated according to the Peripheral Component Interconnect (PCI) (Version 2.1, 1995, PCI Special Interest Group, P.O. Box 14070, Portland, Oreg., 97214). The video subsystem is also responsible for decompressing video images received from the system at User B 13. The network 12 is coupled to an Ethernet network interface 21 which handles the sending of digital video information from the video subsystem over the network 12. The network interface 21 is coupled to the video subsystem 17 and the PCI bus 16 via an ISA (Industry Standard Architecture) bus 20 and a bridge circuit 18.

Referring to FIG. 2, a exemplary video subsystem 17 that is known in the art is shown. The video subsystem is typically run by an application 30 (e.g., a program stored in memory 19 and executed by the processor 15 in FIG. 1). A camera 31 is provided that generates video image data for a video capture component 33. The video capture component 33 "captures" the video image data from the camera one frame at a time in a known manner and at a predetermined rate (e.g., approximately 30 frames per second). The video capture component 33 transfers the video frame data to a video coder/decoder 35 which typically includes a coder/decoder (codec) 36 that compress the video image data for the frame. Typical compression algorithms include any of a variety of block transform based video compression algorithms such as H.261 (International Telecommunication Union—Telecommunications Standardization Sector (ITU-T), March, 1993), H.263 (ITU-T, Dec. 5, 1995), JPEG ("Joint Photographic Expert Group")(International Organization for Standardization/International Electrotechnical Commission ("ISO/IEC") 10918-1), MPEG-I and MPEG-II ("Motion Picture Expert Group")(ISO/IEC 11172-2 and 13818-2). In these block transform based video compression algorithms, the uncompressed video frame data is divided into groups of blocks (GOB) (e.g., 16 horizontal lines of pixels for each group of blocks). Each GOB is divided into a sequence of macroblocks (e.g., 16x16 pixel blocks), each defining a spatial area of the video frame. Each macroblock is compressed using one of the aforementioned algorithms in the coder portion of the codec 36.

The video coder/decoder 35 passes each compressed video image data for each frame to a packet preparation module (PPM) payload handler ("payload handler") 37 which fragments the compressed video image data into packets which each include a number of macroblocks. The appropriate protocol information is added to one or more packets (e.g., according to the so-called Real-Time Transport Protocol (RTP) defined by the Internet Engineering Task Force (IETF)) for transport over the transmission medium. The packets, with the appropriate protocol layer, are then ready to be transported over the network 12 to User B 13.

Packets from User B 13, for example, are received at the payload handler 37 where the RTP protocol information is assessed and "stripped off." The compressed video image data in the packets is ascertained and transferred to the codec 36 in the video coder/decoder 35. The decoder portion of the codec 36 creates uncompressed video image data which can be displayed at a display 39 such as a cathode ray tube (CRT) or active matrix flat-screen under the control of the application 30.

In the system 10 of FIG. 1, packets of information can be lost or the contents of a packet could be in error (e.g., during transmission over the network 12). Systems such as the Video for Windows® (VfW) system and video applications used in the UNIX operating system handle packet loss by skipping the processing of such a packet and continue processing on the next uncompromised packets. Such systems have disadvantages in that by ignoring the lost packet, the relationship between the other packets is compromised leading to errors in what is displayed. Also, errors that occur due to ignoring the lost packet are propagated to other packets that use prediction to determine video image data.

SUMMARY OF THE INVENTION

According to the apparatus and method of the present invention, a first video coder/decoder is provided which receives uncompressed video frame data and generates a first compressed bitstream based on a compression algorithm. A first payload handler coupled to the video coder/decoder fragments the first compressed bitstream into a sequence of packets and appends a transport header to at least one packet identifying the packet in the sequence of packets. A second payload handler is coupled to the first payload handler via a transmission medium, and determines from the transport header whether any of the packets are lost. The second payload handler generates a second compressed bitstream including video frame data from the packets, and appends a bitstream information stream to the second compressed bitstream. The bitstream information stream indicates parameters for decompressing the first compressed bitstream according to a predetermined protocol and places replacement compressed bitstream data in the second compressed bitstream in place of video frame data in the lost packet. A second video coder/decoder is coupled to the second payload handler and generates uncompressed video image data from the replacement compressed bitstream data based on the bitstream information stream.

BRIEF DESCRIPTION OF THE DRAWINGS

FIGS. 7a–c are examples of formats for an H.263 payload header.

FIG. 8 is a VLC table from the H.263 specification that is known in the art.

FIG. 9 is a VLC table from the H.261 specification that is known in the art.

DETAILED DESCRIPTION

Figure 1:
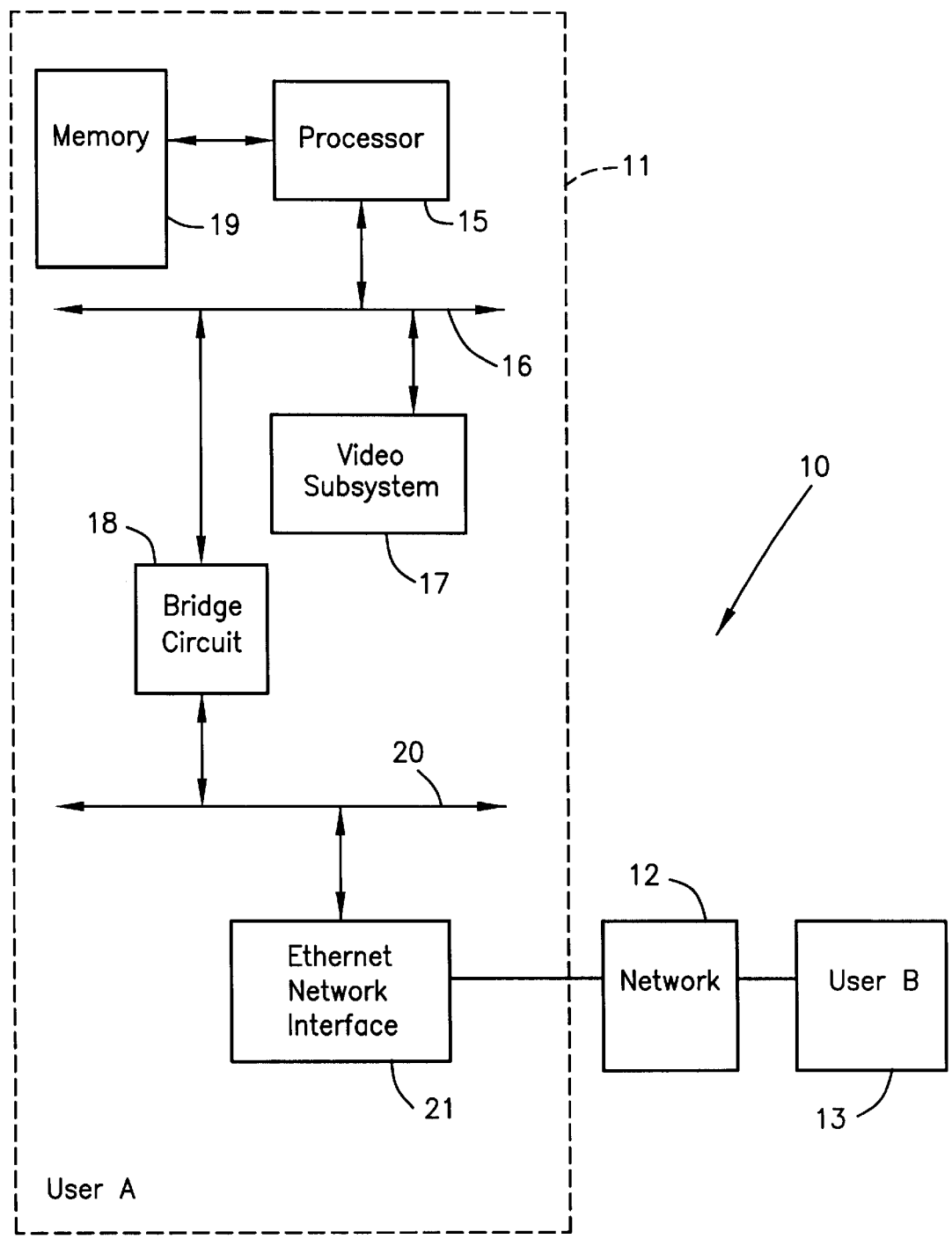
FIG. 1 is a block diagram of video compression and transmission system that is known in the art.
Figure 2:
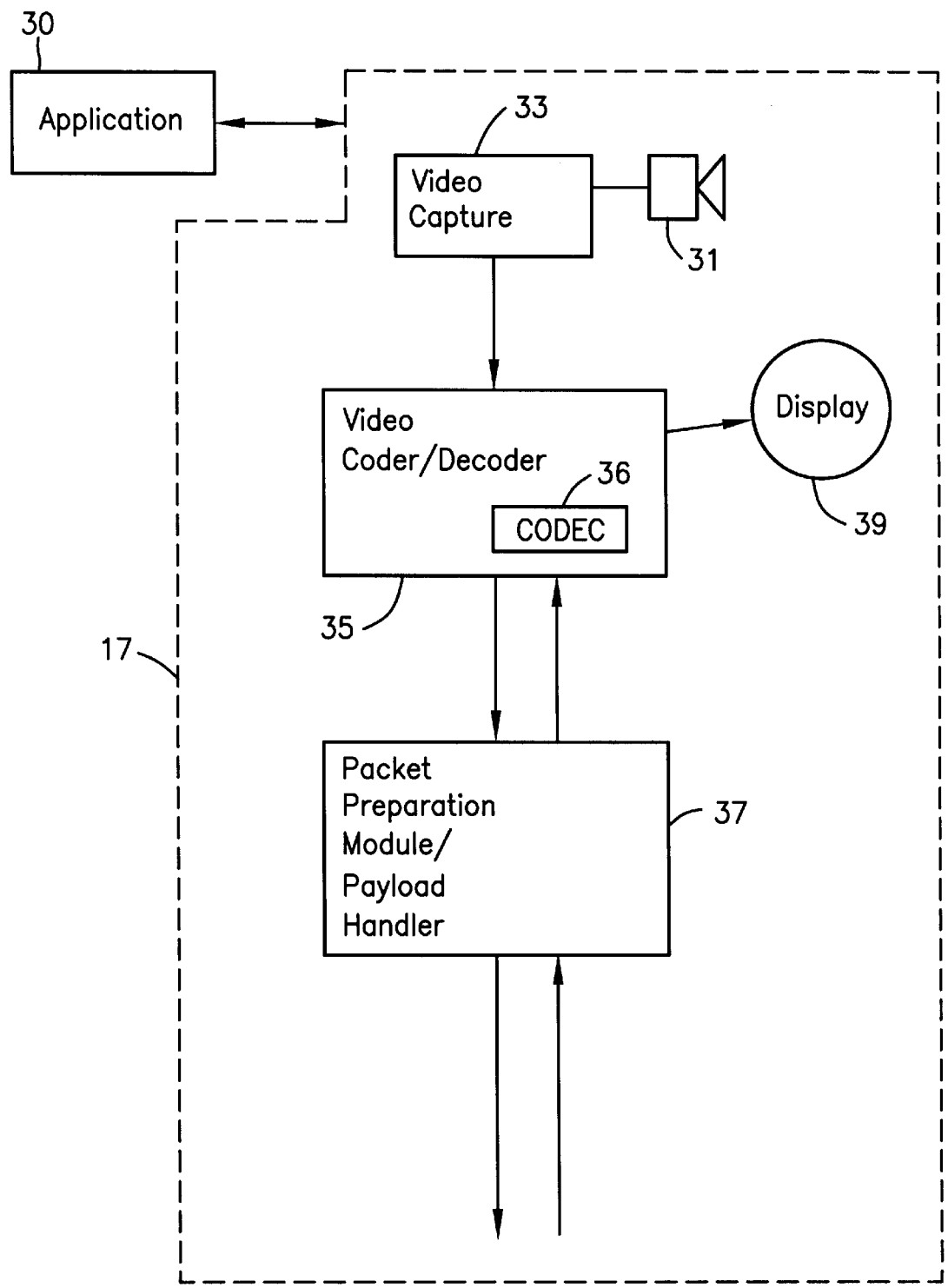
FIG. 2 is a block diagram of a digital video system for the compression and transmission of video data that is known in the art.
Figure 3:
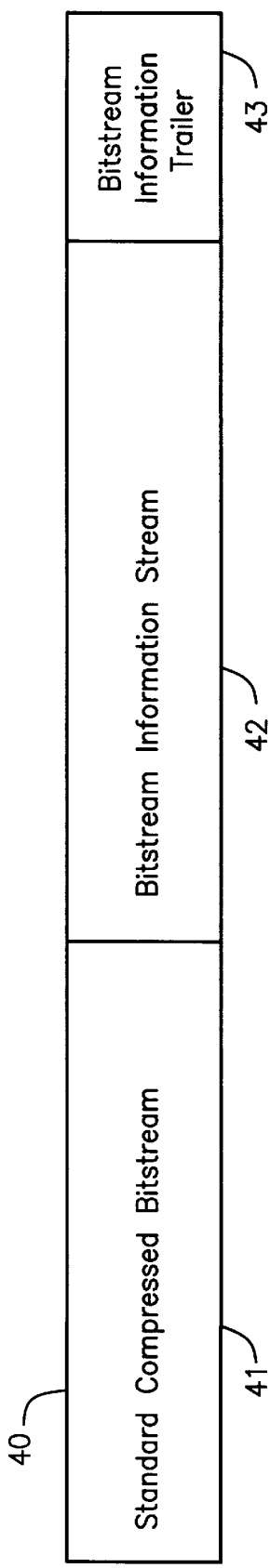
FIG. 3 is an example of a bitstream format of the present invention.

According to an embodiment of the present invention, the operation of the codec 36 is modified to output information in addition to compressed video data (e.g. video data compressed according to a block transform based compression algorithm such as H.261 or H.263, described above). Referring to FIG. 3, an exemplary format for a compressed bitstream generated by the codec 36 is shown. The bitstream 40 includes three parts. The first part is the standard compressed bitstream which has a variable length and a format defined by the block transform based compression algorithm being used. In this example, the standard compressed bitstream 41 is a standard bitstream having a form defined by the H.263 specification. The size of this part is variable and depends on the output of the codec 36 (FIG. 2) for the current frame being compressed. In codecs implementing the H.263 compression algorithm, the output of compressed video image data is usually performed on a frame-by-frame basis. The second part of the bitstream 40 is the bitstream information stream 42. For efficiency in handling the bitstream 40, the beginning of the bitstream information stream 42 is at a double word (i.e., one double word is 32 bits) boundary of the bitstream 40. The data for the bitstream information stream is generated by the codec 36 when coding or compressing video image data, and is read by the codec 36 when decoding or decompressing received compressed video image data. The size of this part would depend on the number of packets that are being generated. The final part of the bitstream 40 is the bitstream information trailer 43, which is used for bitstream verification and packet identification. The size of this portion can have a fixed length.

For an H.263 video bitstream, the bitstream information stream 42 includes an array of structures, where each structure corresponds to a single packet (described further below) and includes a plurality of fields. The first field, defined as FLAGS which includes a PACKET_LOST flag to indicate when a packet is lost. As described below, the payload handler 37 will set this flag when it determines that a packet has been lost during transmission.

Figure 4:
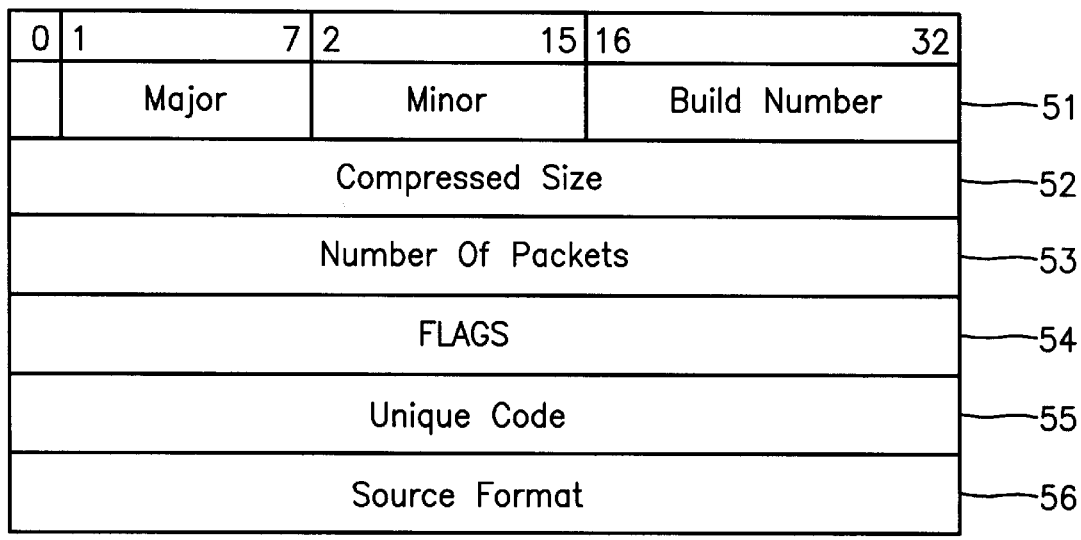
FIG. 4 is an example of a bitstream information stream format of the present invention.

The bitstream information trailer 43 includes a single structure comprising a plurality of fields. The first field is SrcVersion 51 (see FIG. 4) which specifies the source of the extension either generated by the codec 36 or the payload handler 38 at the most significant bit (i.e., bit 0). The remaining bits of this first field are used to designate the build number for the standard compressed bitstream part 41. A second field, CompressedSize 52, defines the compressed size (in bytes) of the standard component bitstream 41 excluding the Bitstream Information Stream 42. A third field, NumberOfPackets 53, specifies the total number of packets for the frame. This information can be used to locate the Bitstream Information Stream 42 in the bitstream 40. Several fields can be provided which are specified by the H.263 specification such as: FLAGS 54 which are the specific flags defined by the H.263 specification that apply to the frame of video data; UniqueCode 55 which is used for the ICM (Installable Compression Manager) driver (as defined in the Video for Windows® system by Microsoft Corporation); SourceFormat 56 which specifies the format of the video image data (e.g., CIF (Common Intermediate Format), QCIF (Quarter Common Intermediate Format), etc.); and others.

Figure 6:
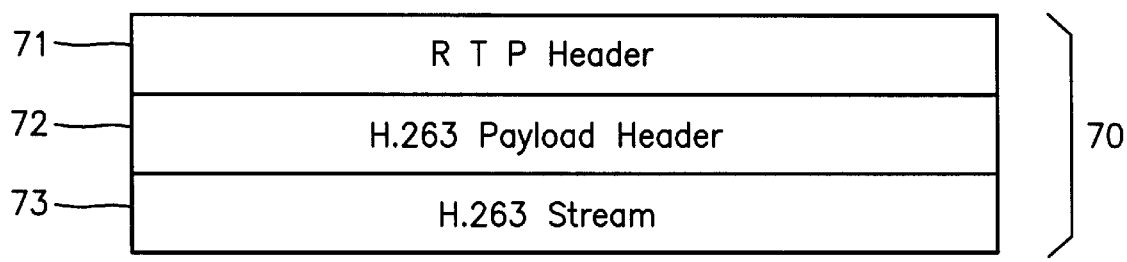
FIG. 6 is an exemplary format of a packet of the present invention.

The compressed bitstream 40 is received at the payload handler 37, which first verifies the Bitstream information trailer 43 of the bitstream 40. If that is successful, the CompressedSize field of the information trailer 43 can be used to locate the beginning of the bitstream information stream 42 to access the first structure for the first packet. The payload handler 37 then uses the bitstream information stream to build packets for transmission. A frame of video image data may contain one or more packets. In this example, a frame of video image data includes five packets (thus, the standard compressed bitstream 41 for a given frame is fragmented into five portions). An exemplary format for each RTP packet is shown in FIG. 6. Each RTP packet 70 includes an RTP header 71 followed by an H.263 payload header 72 and the H.263 bitstream 73. In this example, there is one H.263 packet in each RTP packet and begins with the H.263 payload 72 followed by H.263 data. The bitstream information stream and bitstream information trailer are not needed in the H.263 stream 73 of FIG. 6 since they are used by the payload handler 37 in building packets.

Figure 5:
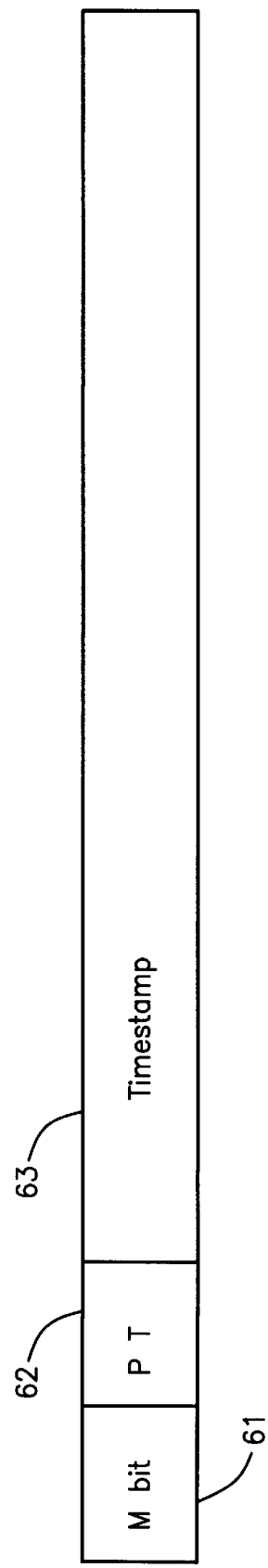
FIG. 5 is an example of an RTP header used in the present invention.

Referring to FIG. 5, the format for a RTP header is shown as defined by the RTP specification. The RTP header includes the following fields for a H.263 bitstream: a Marker bit (M bit) 61 which indicates that the current packet contains the end of the current frame; a Payload Type (PT) field 62 which indicates the type of compression algorithm that is being used on the payload (e.g., H.263 in this example); and a Timestamp field 63 which indicates the sampling instance of the first video frame contained in the RTP data packet. For an H.263 bitstream, the RTP timestamp is based on a 90 kHz clock.

Referring to FIGS. 7a–c, exemplary formats for an H.263 payload header 72 are shown. The payload handler 37 uses the information from the bitstream information stream 42 to fill in data for the H.263 payload header 72. There are three formats (Mode A, Mode B, Mode C) defined for the H.263 payload header 72. Referring to FIG. 7a, the payload header comprises four bytes of information. The F bit indicates the mode of the H.263 payload (e.g., F=0 for Mode A and F=1 for Mode B or C). The P bit indicates the presence of a so-called "PB-frame" and also indicates the mode of the H.263 payload (e.g., P=0 for Mode B and P=1 for Mode C). SBIT represents three bits that indicate the number of bits that should be ignored in the first data byte. EBIT represents three bits that indicate the number of bits that should be ignored in the last data byte. SRC represents three bits and specifies the resolution of the frame as defined by the H.263 specification. R represent a 5-bit reserved field. I-bit indicates whether the current picture frame is intra-coded or not. A-bit indicates whether the optional Advance Prediction Mode is on (as defined by the H.263 specification). The S-bit indicates whether the syntax-based arithmetic code mode is on (as defined by the H.263 specification). DBQ represents 2 bits that indicate a differential quantization parameter to calculate the quantizer value for a B frame based on the quantizer for the P frame when the PB frame is on and should be the same as the DBQUANT value defined by the H.263 specification. TRB represents three bits and defines a temporal reference for the B frame as defined by the H.263 specification. TR represent 8 bits which define the temporal reference fort the P frame as defined by the H.263 specification.

Referring the FIG. 7b, the H.263 payload header for Mode B is shown. The F, P, SBIT, EBIT, SRC, I, A, and S fields are the same as that for Mode A. In Mode A, the standard compressed bitstream can be fragmented at group of block boundaries, and in Modes B and C, the standard compressed bitstream can be fragmented at macroblock boundaries. Accordingly, information necessary to recover the decoder portion of the codec's internal state in the presence of packet loss is needed at the start of the packet. The QUANT field represents 5 bits and indicates the quantization value for the first macroblock coded at the start of the packet. This is equivalent to the value GQUANT as defined by the H.263 specification. GOBN represent 5 bits which define the group of blocks number in effect at the start of the packet. MBA represents 8 bits and defines the absolute address of the first macroblock with its group of blocks. In a H.263 packet, the macroblock header is not coded explicitly in the bitstream. Instead, the macroblock position is determined relative to its immediate previous macroblock. If the previous packet is lost, then the absolute address of the first macroblock within its group of blocks is coded in this field. HMV1 and VMV1 each represent 8 bits and define the horizontal and vertical motion predictors for the first macroblock coded in this packet (the same as MV1 defined by the H.263 specification). HMV2 and VMV2 each represent 8 bits and define horizontal and vertical motion vector predictors from the block or macroblock on the left of block number 3 in the current macroblock when the advanced prediction option is on. Referring to FIG. 7c, the H.263 header for mode C is shown. The fields F, P, SBIT, EBIT, SRC, I, A, S, TR, DBQ, and TRB are the same as in Mode A and the remaining fields are the same as in Mode B. A reserved field, R, of 19 bits is used in Mode C. Further description of the H.263 header can be found in "RTP Payload Format for H.263 Video Stream" by C. Zhu, Internet Draft, Jun. 10, 1996, the disclosure of which is hereby incorporated by reference in its entirety.

In operation when the RTP data is received at the payload handler 37, the RTP header is checked for its timestamp as it relates to the RTP data received earlier. As described above, the RTP header includes a timestamp which also indicates a sequence number for the first video frame contained in the RTP data packet. Since the timestamp is based on a constant frequency clock (e.g., 90 KHz for the H.263 protocol), the timestamps of successive frames should be one clock period (or a multiple of one clock period) apart. If there is a gap in the timestamps ascertained from the RTP header, then it is known that a RTP packet has been lost. By using the information in the RTP header, the payload handler 37 can determine how many packets have been lost.

The payload handler 37 receives the RTP packet and converts it into an extended bitstream having the form of bitstream 40 in FIG. 3. If a packet is missing, then the PACKET_LOST entry of the FLAGS field is set in the bitstream information stream to indicate to the codec 36 that that packet has been lost. Assuming that the next packet is received, the Bit Offset field of the bitstream information stream will indicate the next valid bitstream packet in the standard compressed bitstream 41. The payload handler 37 also fills in the appropriate information for the packet in the bitstream information stream and bitstream information trailer to be used by the codec 36 to reconstruct lost macroblocks. In addition to setting the appropriate flag in the FLAGS field, the payload handler 37 also fills in data into the standard compressed bitstream. According to an embodiment of the present invention, this replacement compressed bitstream data has a predetermined bit pattern, which can be a modification of an expected bit pattern. Accordingly, the bit pattern format for this replacement compressed bitstream data is recognized at the codec 36 as indicating that the packet has been lost. Accordingly, the codec 36 need not look to the bitstream information stream or the bitstream information trailer unless it encounters a bit pattern indicating that a packet has been lost in the standard compressed bitstream in the process of a normal decoding operation. Thus, once the bit pattern is detected, codec 36 performs an exception handling operation to correct the error. Referring to FIG. 8, a VLC (Variable Length Code) table from the H.263 specification is shown. The last entry of this table, labeled "stuffing," shows that when such a macroblock is in the compressed bitstream, the expected code for the MCBPC (Macroblock type & Coded Block Pattern for Chrominance) is 0000 0000 1. The payload handler 37 inserts a 4 byte replacement packet having the following values {0, 0, 128, 3} if the first packet in the frame is lost and values {0, 0, 0, 0} if an intermediate packet is lost. Thus, instead of seeing 0000 0000 1 at the beginning of the first macroblock, the codec 36 will see 0000 0000 0 which indicates a fault. To reset the internal state of the codec 36, the bitstream information stream and bitstream information trailer are accessed to obtain the proper motion vectors, quantization parameters, etc. so that the lost macroblock can be intelligently recreated.

Multiple consecutive packets can be lost, and the packet that includes the marker bit indicating the end of a frame might be lost among them. For example, packet n and n+1 of frame x and packet n+2 (i.e., the first packet) of frame x+1 could be lost in the same burst. In this situation it is not possible to determine whether the n+3 packet is the first packet of frame x+1 without checking the so-called "picture start code." Accordingly, it is assumed that the first packet is lost for frame x+1 and is reconstructed as described above.

The operation of the above embodiment for the H.261 specifications is quite similar. The RTP header 71 as well as the bitstream information trailer have the same form. The bitstream information stream for an H.261 bitstream includes a FLAG field with a PACKET_LOST flag and a BitOffset field to identify the macroblocks corresponding to the particular structure. MBAP, Quant, GOBN, HMV and VMV fields are provided as defined by the H.261 specification. Referring to FIG. 9, a VLC table for Macroblock addressing from the H.261 specification is shown. If the lost packet is the first packet of a frame then the 8 byte value of {0, 1, 0, 0, 0, 1, 0, 0} is inserted for the packet which will result in the expected start code of 0000 0000 0000 0001, but an error for the expected code for MBA stuffing. for packets other than the first one for a frame, 4 bytes of 0's are inserted as the new packet to cause an error in the codec 36.

Using the system of the present invention, the internal state of a codec 36 can be preserved in the face of lost packets. A result is achieved that has better results when compared to concatenation of received packets without recognition of missing packets. Although several embodiments are specifically illustrated and described herein, it will be appreciated that modifications and variations of the present invention are covered by the above teachings and within the purview of the appended claims without departing from the spirit and intended scope of the invention.

What is claimed is:

1. An apparatus for handling packet loss in a packet video environment comprising:

a first video coder/decoder receiving uncompressed video frame data, said video coder/decoder generating a first compressed bitstream based on a compression algorithm;

a first payload handler coupled to said video coder/decoder fragmenting said first compressed bitstream into a sequence of packets and appending a transport header to at least one packet identifying said packet in said sequence of packets;

a second payload handler coupled to said first payload handler via a network, and determining from said transport header whether at least one of said packets is lost, and generating a second compressed bitstream from said packets, and appending a bitstream information stream to said second compressed bitstream indicating parameters for decompressing said first compressed bitstream and placing replacement compressed bitstream data in said second compressed bitstream in place of video frame data in said lost packet;

a second video coder/decoder coupled to said second payload handler and generating uncompressed video image data from said replacement compressed bitstream data based on said bitstream information stream.

2. The apparatus of claim 1 wherein said first video coder/decoder appends an additional bitstream information stream to said first compressed identifying said packets in said first compressed bitstream.

3. The apparatus of claim 2, wherein said video frame data is compressed according to a block transform based compression algorithm.

4. The apparatus of claim 3, wherein said block transform based compression algorithm is an H.263 compression algorithm.

5. The apparatus of claim 3, wherein said block transform based compression algorithm is an H.261 compression algorithm.

6. The apparatus of claim 1 wherein said replacement compressed bitstream data has a predetermined bit pattern.

7. The apparatus of claim 6 wherein the predetermined bit pattern of said replacement compressed bitstream data is a modification of an expected bit pattern of said second compressed bitstream.

8. The apparatus of claim 7 wherein said second coder/decoder recognizes the predetermined bit pattern of said replacement compressed bitstream as indicating that at least one of said packets is lost.

9. The apparatus of claim 7 wherein said second coder/decoder recognizes the predetermined bit pattern of said replacement compressed bitstream during a normal decoding operation of said second compressed bitstream and performs an exception handling operation to generate uncompressed video image data from said replacement compressed bitstream data based on said bitstream information stream.

10. A method of handling lost packets in a packet video environment comprising:

compressing video frame data into a first compressed bitstream;

fragmenting said standard compressed bitstream into a sequence of packets;

appending transport header information to at least one packet, said transport header information indicating identifying said at least one packet in said sequence of packets;

transmitting said packets over a transmission medium;

determining from said transport header information of said packets whether at least one of said packets is lost;

generating a second standard bitstream from said packets including said video frame data;

appending to said second compressed bitstream a bitstream information stream identifying which of said video frame data are lost and indicating parameters for decompressing said first compressed bitstream;

placing replacement compressed bitstream data in said second standard compressed bitstream in place of video frame data in said lost packet; and generating uncompressed video image data from said replacement compressed bitstream data based on said bitstream information stream.

11. The method of claim 10 further comprising:

appending to said compressed bitstream, and additional bitstream information stream identifying said packets in said first compressed bitstream.

12. The method of claim 11, wherein said video frame data is compressed according to a block transform based compression algorithm.

13. The method of claim 12, wherein said block transform based compression algorithm is an H.263 compression algorithm.

14. The method of claim 12, wherein said block transform based compression algorithm is an H.261 compression algorithm.

15. The method of claim 10 wherein said replacement compressed bitstream data has a predetermined bit pattern.

16. The method of claim 15 wherein the predetermined bit pattern of said replacement compressed bitstream data is a modification of an expected bit pattern of said second compressed bitstream.

17. The method of claim 16 further comprising:

recognizing the predetermined bit pattern of said replacement compressed bitstream data by said second coder/decoder as indicating that at least one of said packets is lost.

18. The method of claim 16, further comprising:

recognizing the predetermined bit pattern of said replacement compressed bitstream data at said second video coder/decoder during a normal decoding operation of said second compressed bitstream; and performing an exception handling operation to generate uncompressed video image data from said replacement compressed bitstream data based on said bitstream information stream.

* * * * *

UNITED STATES PATENT AND TRADEMARK OFFICE
CERTIFICATE OF CORRECTION

PATENT NO. : 6,201,834 B1 Page 1 of 1
APPLICATION NO. : 08/772227
DATED : March 13, 2001
INVENTOR(S) : Chunrong Zhu It is certified that error appears in the above-identified patent and that said Letters Patent is hereby corrected as shown below:

| | |
|---|---|
| Title Page, Item (57) Abstract | "vide" should be --video-- |
| Col. 4, Line 66 | "fort" should be --for-- |
| Col. 6, Line 53 | "has better results" should be --is superior-- |
| Col. 7, Line 22 | "compressed identifying" should be --compressed bitstream identifying-- |
| Col. 8, Line 23 | "and" should be --an-- |

Signed and Sealed this

Twenty-first Day of November, 2006

JON W. DUDAS
*Director of the United States Patent and Trademark Office*